United States Patent
Yamagishi et al.

(10) Patent No.: US 12,434,327 B2
(45) Date of Patent: Oct. 7, 2025

(54) FRICTION STIR SPOT WELDED JOINT AND PRODUCTION METHOD THEREFOR, AND FRICTION STIR SPOT WELDING METHOD

(71) Applicants: JFE STEEL CORPORATION, Tokyo (JP); KAWASAKI JUKOGYO KABUSHIKI KAISHA, Kobe (JP)

(72) Inventors: Daiki Yamagishi, Tokyo (JP); Katsutoshi Takashima, Tokyo (JP); Hiroshi Matsuda, Tokyo (JP); Ryoji Ohashi, Kobe (JP); Yoshitaka Muramatsu, Kobe (JP); Takuya Fukuda, Kobe (JP)

(73) Assignees: JFE STEEL CORPORATION, Tokyo (JP); KAWASAKI JUKOGYO KABUSHIKI KAISHA, Hyogo (JP)

( * ) Notice: Subject to any disclaimer, the term of this patent is extended or adjusted under 35 U.S.C. 154(b) by 81 days.

(21) Appl. No.: 18/683,248

(22) PCT Filed: Jul. 21, 2022

(86) PCT No.: PCT/JP2022/028411
§ 371 (c)(1),
(2) Date: Feb. 13, 2024

(87) PCT Pub. No.: WO2023/032515
PCT Pub. Date: Mar. 9, 2023

(65) Prior Publication Data
US 2025/0065438 A1  Feb. 27, 2025

(30) Foreign Application Priority Data
Aug. 31, 2021  (JP) .................... 2021-141900

(51) Int. Cl.
B23K 20/12 (2006.01)
B32B 7/05 (2019.01)
(Continued)

(52) U.S. Cl.
CPC ...... B23K 20/1265 (2013.01); B23K 20/1225 (2013.01); B23K 20/1255 (2013.01);
(Continued)

(58) Field of Classification Search
CPC .................. B23K 20/1225; B23K 20/1265
See application file for complete search history.

(56) References Cited

U.S. PATENT DOCUMENTS

2010/0178526 A1  7/2010  Fujii et al.
2017/0151625 A1  6/2017  Utsumi et al.
(Continued)

FOREIGN PATENT DOCUMENTS

EP  3533556 A1  9/2019
JP  2009241084 A  10/2009
(Continued)

OTHER PUBLICATIONS

Sep. 16, 2024, the Extended European Search Report issued by the European Patent Office in the corresponding European Patent Application No. 22864103.1.
(Continued)

*Primary Examiner* — Adam Krupicka
(74) *Attorney, Agent, or Firm* — KENJA IP LAW PC

(57) ABSTRACT

Provided is a friction stir spot welded joint having high cross tensile strength even in the case where a steel sheet having a soft surface layer is used as a material to be welded. An annular groove is formed on an upper surface of an upper sheet out of overlapping steel sheets, and a shape and hardness of a welded portion are appropriately controlled simultaneously.

6 Claims, 2 Drawing Sheets

(51) Int. Cl.
B32B 15/01 (2006.01)
*B23K 103/04* (2006.01)

(52) U.S. Cl.
CPC .............. B32B 7/05 (2019.01); B32B 15/011 (2013.01); *B23K 2103/04* (2018.08); *B32B 2250/02* (2013.01); *B32B 2311/30* (2013.01)

(56) References Cited

U.S. PATENT DOCUMENTS

| | | |
|---|---|---|
| 2019/0262934 A1 | 8/2019 | Ohashi et al. |
| 2022/0145435 A1 | 5/2022 | Fujii et al. |

FOREIGN PATENT DOCUMENTS

| | | |
|---|---|---|
| JP | 5099009 B2 | 12/2012 |
| JP | 6160345 B2 | 7/2017 |
| JP | 2018094618 A | 6/2018 |
| WO | 2016006377 A1 | 1/2016 |
| WO | 2018079806 A1 | 5/2018 |
| WO | 2020184124 A1 | 9/2020 |

OTHER PUBLICATIONS

Y. Hovanski et al., Friction stir spot welding of hot-stamped boron steel, Scripta Materialia, 2007, pp. 873-876, vol. 57.
Oct. 11, 2022, International Search Report issued in the International Patent Application No. PCT/JP2022/028411.

FRICTION STIR SPOT WELDED JOINT AND PRODUCTION METHOD THEREFOR, AND FRICTION STIR SPOT WELDING METHOD

TECHNICAL FIELD

The present disclosure relates to a friction stir spot welded joint and a production method therefor, and a friction stir spot welding method.

BACKGROUND

When assembling automobiles, press-formed steel materials (parts) are often joined by resistance welding from the viewpoint of cost and efficiency.

The application of friction stir spot welding to steel materials is also studied in recent years. Friction stir spot welding is a spot welding method using a friction stir phenomenon. Specifically, while rotating a tool including a shoulder portion and a pin portion protruding from the shoulder portion, the pin portion of the tool is press-fitted (pushed) into materials to be welded that are overlapping metal sheets. This causes the metal sheets to soften and plastically flow, thus welding the overlapping metal sheets.

As a technique related to such friction stir spot welding, for example, JP 6160345 B2 (PTL 1) describes "A friction stir spot welding method in which a first part and a second part made of metal materials are overlapped in a state in which a soft portion is located at their boundary, a pin portion of a rotating tool is press-fitted from the first part to the second part while rotating the pin portion, and the first part and the second part are stirred to be spot-welded, wherein at least one of the first part and the second part is made of a metal material whose tensile strength at 800° C. and a strain rate of $10^{-3}$ s$^{-1}$ is 100 MPa or more, the soft portion has a hardness lower than a base material hardness of the metal material whose tensile strength is 100 MPa or more at room temperature, the soft portion is a soft layer formed at least in a surface layer of the metal material whose tensile strength is 100 MPa or more, and the metal material whose tensile strength is 100 MPa or more is carbon steel having a C content of 0.3% or more in mass % and the soft layer is a decarburized layer having a C content of 0.1% or less in mass %."

CITATION LIST

Patent Literature

PTL 1: JP 6160345 B2

SUMMARY

Technical Problem

However, in the case where a cross tensile test is performed using a friction stir spot welded joint obtained by the technique described in PTL 1, a fracture occurs along the soft portion located at the boundary between the first part and the second part and sufficient cross tensile strength cannot be obtained.

It could therefore be helpful to provide a friction stir spot welded joint having high cross tensile strength even in the case where a steel sheet having a soft layer in its surface layer (hereafter also referred to as "soft surface layer") is used as a material to be welded, and a production method therefor.

It could also be helpful to provide a friction stir spot welding method for obtaining the friction stir spot welded joint.

Herein, "high cross tensile strength" means that the cross tensile strength measured by a cross tensile test in accordance with JIS Z 3137 is 8.0 kN or more.

Solution to Problem

Upon careful examination, we discovered that high joint strength can be obtained even in the case where a steel sheet having a soft surface layer is used as a material to be welded by:
forming an annular groove on the upper surface of a welded portion, and
appropriately controlling the shape and hardness of the welded portion simultaneously, specifically, satisfying the following (a) to (c) simultaneously:
(a) The vertical position of the deepest point of the recess of the welded portion satisfies at least one of −0.5 mm or less and −TL×0.50 or less, with the lower mating surface of the steel sheets which are the materials to be welded as a reference position.
(b) The vertical position of the highest point of the welding interface is +TU×0.50 or more, with the upper mating surface of the steel sheets which are the materials to be welded as a reference position.
(c) At a vertical position: +TU×0.50 or +TU×0.60, the difference between the hardness at the position of the welding interface and the hardness at a position that is (the position of the welding interface+350 μm) in horizontal position is 80 HV or less.

Upon further examination, we discovered that, in order to obtain the foregoing friction stir spot welded joint, it is important to satisfy the following (d) to (f) simultaneously during welding:
(d) The vertical position of the maximum press-fitting depth of the tool satisfies at least one of −0.5 mm or less and −TL×0.50 or less with the lower mating surface of the steel sheets as a reference position, and the shoulder and the upper sheet of the material to be welded are in contact with each other (i.e. the material to be welded is pressed by the shoulder) when the tool reaches the maximum press-fitting depth.
(e) The maximum arrival temperature is 850° C. or less.
(f) Welding conditions are appropriately controlled. Specifically, the relationship of the following formula (1) is satisfied for the tool rotation speed, the tool press-fitting amount, and the pressing force:

[Math. 1]

$$\sum_{k=0}^{n} \frac{R_{k+1} \times A_{k+1}}{\sqrt[3]{P_{k+1}}} \leq 41.0 \quad (1)$$

where n is the number of times a welding condition is switched, $R_{k+1}$ is the tool rotation speed (rpm) after the kth welding condition switching, $A_{k+1}$ is the tool press-fitting amount (mm) from the time of the kth welding condition switching to the time of the (k+1)th welding condition switching, and $P_{k+1}$ is the pressing force (N) after the kth welding condition switching.

Here, $R_1$ is the initial tool rotation speed (rpm), $A_1$ is the tool press-fitting amount (mm) under the initial welding condition, $P_1$ is the initial pressing force (N), and $A_{n+1}$ is the tool press-fitting amount (mm) from the time of the nth welding condition switching to when the tool reaches the maximum press-fitting depth.

The present disclosure is based on these discoveries and further studies.

We thus provide:

1. A friction stir spot welded joint comprising: two or more overlapping steel sheets; a welded portion of the steel sheets; and an annular groove on an upper surface of the welded portion, wherein at least one of the steel sheets has a soft surface layer, the welded portion includes a recess, a first flow portion adjacent to the recess, a second flow portion adjacent to the first flow portion, and a welding interface that is a boundary between the first flow portion and the second flow portion, a vertical position of a deepest point of the recess satisfies at least one of −0.5 mm or less and −TL×0.50 or less, with a lower mating surface of the steel sheets as a reference position, a vertical position of a highest point of the welding interface is +TU×0.50 or more, with an upper mating surface of the steel sheets as a reference position, at a vertical position: +TU×0.50 or +TU×0.60, a difference between a hardness at a position of the welding interface and a hardness at a position that is (the position of the welding interface+350 μm) in horizontal position is 80 HV or less, the two or more overlapping steel sheets include an upper sheet and a lower sheet that are respectively a steel sheet located at a top and a steel sheet located at a bottom, TU is a thickness in mm of the upper sheet, TL is a thickness in mm of the lower sheet, the upper mating surface is a mating surface between the upper sheet and a steel sheet adjacent to the upper sheet, the lower mating surface is a mating surface between the lower sheet and a steel sheet adjacent to the lower sheet, and the vertical position is + when above the reference position and is − when below the reference position, and the horizontal position is a distance from a reference position.
2. The friction stir spot welded joint according to 1., wherein an average carbon concentration of the soft surface layer is less than or equal to 80% of a carbon concentration of a chemical composition of the steel sheet having the soft surface layer.
3. A friction stir spot welding method comprising, while rotating a tool including a shoulder portion and a pin portion protruding from the shoulder portion, press-fitting the pin portion into two or more overlapping steel sheets as materials to be welded to weld the steel sheets, wherein at least one of the steel sheets as the materials to be welded has a soft surface layer, a vertical position of a maximum press-fitting depth of the tool satisfies at least one of −0.5 mm or less and −TL×0.50 or less with a lower mating surface of the steel sheets as a reference position, and the shoulder portion and an upper sheet are in contact with each other when the tool reaches the maximum press-fitting depth, a maximum arrival temperature is 850° C. or less, a relationship of the following formula (1) is satisfied:

[Math. 2]

$$\sum_{k=0}^{n} \frac{R_{k+1} \times A_{k+1}}{\sqrt[3]{P_{k+1}}} \leq 41.0 \quad (1)$$

where n is a number of times a welding condition is switched, $R_{k+1}$ is a tool rotation speed in rpm after kth welding condition switching, $A_{k+1}$ is a tool press-fitting amount in mm from a time of the kth welding condition switching to a time of (k+1)th welding condition switching, and $P_{k+1}$ is a pressing force in N after the kth welding condition switching, $R_1$ is an initial tool rotation speed in rpm, $A_1$ is a tool press-fitting amount in mm under an initial welding condition, $P_1$ is an initial pressing force in N, and $A_{n+1}$ is a tool press-fitting amount in mm from a time of nth welding condition switching to when the tool reaches the maximum press-fitting depth, the two or more overlapping steel sheets include the upper sheet and a lower sheet that are respectively a steel sheet located at a top and a steel sheet located at a bottom, TL is a thickness in mm of the lower sheet, the lower mating surface is a mating surface between the lower sheet and a steel sheet adjacent to the lower sheet, and the vertical position is + when above the reference position and is − when below the reference position.
4. The friction stir spot welding method according to 3., wherein an average carbon concentration of the soft surface layer is less than or equal to 80% of a carbon concentration of a chemical composition of the steel sheet having the soft surface layer.
5. A production method for a friction stir spot welded joint, comprising welding two or more overlapping steel sheets by the friction stir spot welding method according to 3, or 4.

Advantageous Effect

It is thus possible to obtain a friction stir spot welded joint having high cross tensile strength even in the case where a steel sheet having a soft surface layer is used as a material to be welded. This is very useful in industrial terms because friction stir spot welding can be applied to a wider range of steel sheets.

DETAILED DESCRIPTION

The presently disclosed techniques will be described by way of embodiments below.

[1] Friction Stir Spot Welded Joint

Figure 1:
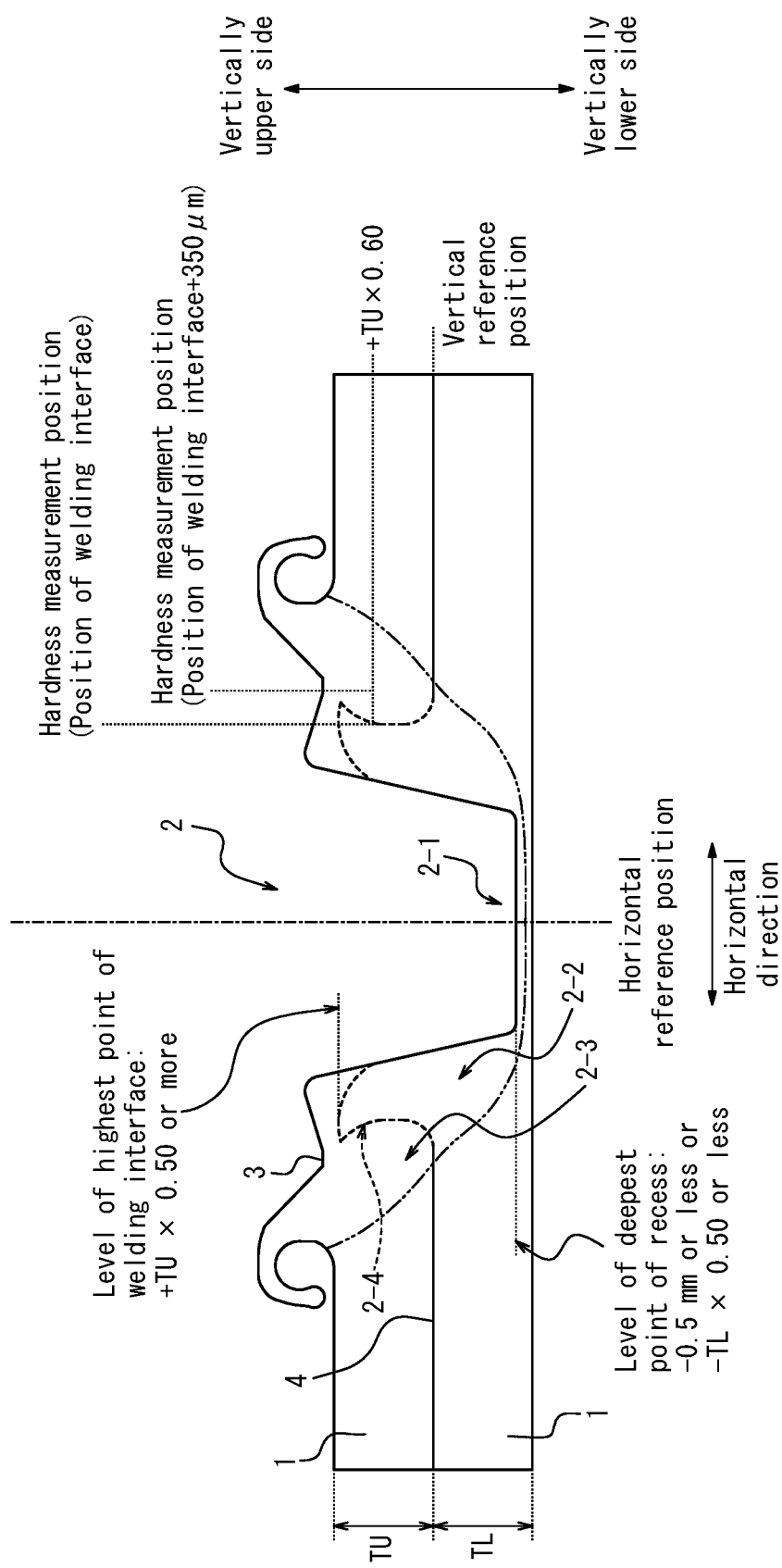
FIG. 1 is a schematic diagram of a vertical section of a friction stir spot welded joint according to an embodiment of the present disclosure.

First, a friction stir spot welded joint according to an embodiment of the present disclosure will be described with reference to FIG. 1. An example in which the materials to be welded are two steel sheets is used in FIG. 1. FIG. 1 illustrates a vertical section of a friction stir spot welded joint passing through the center position of a recess of a welded portion (hereafter also simply referred to as "vertical section"), and the position of each part is in the vertical section.

The vertically (the steel sheet thickness direction) upper side is the side on which a pin portion of a tool is press-fitted during friction stir spot welding. The vertically lower side is the side on which a backing material is installed during friction stir point welding (i.e. the side opposite to the side on which the pin portion of the tool is press-fitted during friction stir point welding). The vertically upper side and lower side of a friction stir spot welded joint can be identified from the shape of the joint, e.g. the position of the recess. Of the steel sheets as the materials to be welded, the uppermost steel sheet (the steel sheet located at the top) is also referred to as "upper sheet", the lowermost steel sheet (the steel sheet located at the bottom) as "lower sheet", and each steel sheet located between the top and the bottom (each steel sheet other than the top and the bottom) as "intermediate sheet". An upper surface is a surface on the vertically upper side, and a lower surface is a surface on the vertically lower side.

As illustrated in FIG. 1, the friction stir spot welded joint according to an embodiment of the present disclosure includes overlapping steel sheets 1, a welded portion 2 of the steel sheets, and an annular groove 3 on the upper surface of the welded portion. The gap remaining between the overlapping steel sheets (without being welded) is an unwelded interface 4.

[Welded Portion]

As illustrated in FIG. 1, the welded portion includes a recess 2-1, a first flow portion 2-2 adjacent to the recess, a second flow portion 2-3 adjacent to the first flow portion, and a welding interface 2-4 that is the boundary between the first flow portion and the second flow portion.

The recess is formed by press-fitting the pin portion of the tool during welding. The recess is approximately circular when viewed from above in the vertical direction, and its diameter is approximately equal to the diameter of the pin portion of the tool. The center position of the recess is the center of the recess when viewed from above in the vertical direction.

The first flow portion is a flow region formed by plastic flow of the lower sheet during welding, and is adjacent to the periphery of the recess. The second flow portion is a flow region formed by plastic flow of the upper sheet, and is adjacent to the first flow portion. In the case where the number of steel sheets as the materials to be welded is three or more, a flow region formed by plastic flow of each intermediate sheet is included in the second flow portion.

The first flow portion and the second flow portion are defined as follows. This identifies the welding interface which is the boundary between the first flow portion and the second flow portion.

The vertical section of the friction stir spot welded joint passing through the center position of the recess of the welded portion is polished and etched with a saturated picric acid solution. The vertical section is then observed with an optical microscope, and the first flow portion and the second flow portion are defined based on, for example, the degrees of etching in the base metal microstructure and the flow portions. The boundary between the defined first flow portion and second flow portion is taken to be the welding interface.

It is important to control the shape and hardness of the welded portion as follows.

Here, the two or more overlapping steel sheets include the upper sheet and the lower sheet that are respectively the steel sheet located at the top and the steel sheet located at the bottom, TU is the thickness (mm) of the upper sheet, TL is the thickness (mm) of the lower sheet, the upper mating surface is the mating surface between the upper sheet and the steel sheet adjacent to the upper sheet, and the lower mating surface is the mating surface between the lower sheet and the steel sheet adjacent to the lower sheet.

The vertical position is + when above the reference position and is − when below the reference position. The horizontal position is the distance from the reference position (the reference position is 0, and the horizontal position is not − (i.e. does not take a negative value)).

(a) Vertical Position of Deepest Point of Recess (Hereafter Also Referred to as "Level of Deepest Point of Recess")

The level of the deepest point of the recess satisfies at least one of −0.5 mm or less and −TL×0.50 or less, with the lower mating surface of the steel sheets which are the materials to be welded as a reference position. Thus, the welding interface is strengthened and high cross tensile strength is obtained even in the case where a steel sheet having a soft surface layer is used as a material to be welded. The level of the deepest point of the recess is preferably −TL×0.90 or more, without being limited thereto.

(b) Vertical Position of Highest Point of Welding Interface (Hereafter also referred to as "level of highest point of welding interface")

The level of the highest point of the welding interface is +TU×0.50 or more, with the upper mating surface of the steel sheets which are the materials to be welded as a reference position. The level of the highest point of the welding interface is preferably +TU×0.60 or more. Thus, the welding interface is strengthened and high cross tensile strength is obtained even in the case where a steel sheet having a soft surface layer is used as a material to be welded. A higher level of the highest point of the welding interface is more preferable. For example, the level of the highest point of the welding interface may reach a region discharged to the outside as burrs from the periphery of the shoulder portion of the tool. The level of the highest point of the welding interface is more preferably +TU×0.98 or less.

The welding interface typically has a shape that is curved toward the vertically upper side (i.e. a shape that is convex upward in the vertical direction) in the vertical section.

The level of the deepest point of the recess and the level of the highest point of the welding interface can be measured with a caliper square or the like using a photographed image of the vertical section of the friction stir spot welded joint used to identify the welding interface.

(c) Difference Between Hardness at Position of Welding Interface and Hardness at Position that is (Position of Welding Interface+350 μm) in Horizontal Position at Vertical Position: +TU×0.50 or +TU×0.60 (Hereafter Also Simply Referred to as "Hardness Difference at Predetermined Level of Welded Portion")

We investigated the cause of the problem in that, in the case where a cross tensile test is performed using a friction stir spot welded joint obtained by the technique described in PTL 1, a fracture occurs along the soft portion located at the boundary between the first part and the second part and sufficient cross tensile strength cannot be obtained. We consequently found that, when a steel sheet having a soft surface layer is used as a material to be welded, the hardness decreases at the welding interface due to the soft surface layer, as a result of which a fracture occurs along the soft portion located at the boundary between the first part and the second part in the case where a cross tensile test is performed. Upon further examination, we discovered that such a fracture along the soft portion can be prevented by forming an annular groove on the upper surface of the welded portion and satisfying the foregoing requirements (a) and (b), and simultaneously reducing the hardness difference at the predetermined level of the welded portion, i.e. the hardness difference between the welding interface and the second flow portion at the installation level of the upper sheet.

In particular, if the hardness difference at the predetermined level of the welded portion is 80 HV or less, the fracture along the soft portion is effectively prevented and the cross tensile strength is improved. If the hardness difference at the predetermined level of the welded portion is more than 80 HV, the fracture along the soft portion cannot be sufficiently prevented and the cross tensile strength decreases. The hardness difference at the predetermined level of the welded portion is therefore 80 HV or less. The hardness difference at the predetermined level of the welded portion is preferably 70 HV or less, and more preferably 60 HV or less. No lower limit is placed on the hardness difference at the predetermined level of the welded portion, and the hardness difference may be 0.

The hardness difference at the predetermined level of the welded portion is basically measured at a vertical position: +TU×0.60. In the case where the level of the highest point of the welding interface is less than +TU×0.60, the hardness difference at the predetermined level of the welded portion is measured at a vertical position: +TU×0.50.

The reason that the hardness difference at the predetermined level of the welded portion is basically measured at a vertical position: +TU×0.60 (hereafter also referred to as "+TU×0.60") is as follows.

In the case of a sound friction stir spot joint, +TU×0.60 is a position where a sufficiently firm weld can be obtained at the welding interface. Hence, if a soft portion is not formed near the welding interface, a fracture along the welding interface does not occur at the position. If a soft portion is formed near the welding interface, on the other hand, the soft microstructure fractures along the welding interface at the position. Thus, +TU×0.60 is a position where the difference between the hardness at the position of the welding interface and the hardness at a position that is (the position of the welding interface+350 µm) significantly influences the fracture path. +TU×0.60 is therefore a position suitable for measuring the hardness difference (in other words, determining whether a soft layer is formed near the welding interface). A vertical position: +TU×0.50 is also a position suitable for measuring the hardness difference, for the same reason. At a vertical position: +TU×0.50, however, there is a possibility that the hardness measurement value is affected by segregation that occurs in the mid-thickness part of the steel sheet.

Accordingly, it is preferable to measure the hardness difference at +TU×0.60 if possible.

The hardness at each position is measured in accordance with JIS Z 2244. Specifically, the measurement is performed in the following manner.

Using the vertical section of the friction stir spot welded joint illustrated in FIG. 1 (i.e. the vertical section of the friction stir spot welded joint passing through the center position of the recess of the welded portion) as a measurement plane, Vickers hardness (HV) is measured at each position with a test force of 2.942 N.

[Annular Groove]

The annular groove is formed on the upper surface of the welded portion, as illustrated in FIG. 1. The annular groove is located on the upper surface of the welded portion so as to surround the recess. In detail, the annular groove is formed as a result of contact between the shoulder portion of the tool and the upper sheet during welding. The formation of the annular groove strengthens the welding interface. Hence, high joint strength is obtained even in the case where a steel sheet having a soft surface layer is used as a material to be welded.

Whether the annular groove is present can be determined by visually observing the appearance of the upper surface of the friction stir spot welded joint and observing the vertical section of the friction stir spot welded joint.

[Steel Sheet]

At least one of the steel sheets as the materials to be welded has a soft surface layer. The number of steel sheets having a soft surface layer is not limited, and all steel sheets as the materials to be welded may have a soft surface layer.

The soft surface layer is a region whose ferrite fraction is at least twice the ferrite fraction at the position of ⅓ of the sheet thickness. In the case where a soft surface layer with a thickness of 1 µm or more is present on at least one side of the steel sheet, the steel sheet is determined to have a soft surface layer.

In other words, "having a soft surface layer" means that a region whose ferrite fraction is at least twice the ferrite fraction at the position of ⅓ of the sheet thickness is present on at least one side of the steel sheet and the thickness of the region is 1 µm or more.

For example, the thickness of the soft surface layer is measured in the following manner.

A test piece is cut out from the steel sheet so that any section perpendicular to the surface of the steel sheet will be an observation plane. The observation plane is then polished and etched with 3 vol % nital to reveal the microstructure. Next, the microstructure at various thickness positions from the upper surface to lower surface of the steel sheet is photographed using a scanning electron microscope (SEM) with 2000 magnification at a pitch (interval in the thickness direction) of 100 µm. From the obtained microstructure images at the various thickness positions, the area of ferrite at each thickness position is calculated using Adobe Photoshop available from Adobe Systems Co., Ltd. The area of ferrite at each thickness position is then divided by the area of the corresponding visual field area, and the resultant value is taken to be the ferrite fraction at the thickness position. Here, a phase observed as black on a relatively smooth plane is assumed to be ferrite. Next, the deepest position of the thickness position at which the ferrite fraction is at least twice the ferrite fraction at the position of ⅓ of the sheet thickness (hereafter also referred to as "deepest position") is identified on both sides (upper and lower surfaces) of the steel sheet. From these thickness positions, the thickness of the soft surface layer on both sides (upper and lower surfaces) of the steel sheet (i.e. the distance from the upper surface to the deepest position (on the upper surface side) and the distance from the lower surface to the deepest position (on the lower surface side)) is identified. In the case where the thickness of the soft surface layer is 10 µm or less, one to three images of the microstructure at various thickness positions near the upper and lower surfaces of the steel sheet are taken using a SEM with 10000 magnification at a pitch (interval in the thickness direction) of 5 µm, and the ferrite area and the ferrite fraction at each thickness position are equally calculated using Adobe Photoshop available from Adobe Systems Co., Ltd. The thickness of the soft surface layer is thus identified. The starting point (i.e. the position where the sheet thickness is 0) for the position of ⅓ of the sheet thickness may be any of the upper and lower surfaces. If the ferrite fraction at the position of ⅓ of the sheet thickness is different between when the upper surface is the starting point and when the lower surface is the starting point, it is preferable to adopt the larger value of ferrite fraction.

The average carbon concentration of the soft surface layer is preferably less than or equal to 80% of the carbon concentration of the chemical composition of the steel sheet having the soft surface layer. Here, the average carbon concentration of the soft surface layer is measured, for example, by FE-EPMA.

Specifically, a test piece is cut out from the steel sheet so that any section perpendicular to the surface of the steel sheet will be an observation plane. Next, using FE-EPMA, the carbon concentration at various depth positions of the test piece is measured, and the carbon concentration distribution in the depth direction of the steel sheet is determined. The average value of the carbon concentrations at the depth positions corresponding to the soft surface layer is then calculated and taken to be the average carbon concentration of the soft surface layer.

The number of steel sheets as the materials to be welded is two or more. Although no upper limit is placed on the number of steel sheets as the materials to be welded, the number of steel sheets as the materials to be welded is preferably five or less. The steel sheets as the materials to be welded may be steel sheets of the same steel type or steel sheets of different steel types.

The sheet thickness of the steel sheets as the materials to be welded is preferably 0.4 mm to 3.2 mm. The steel sheets as the materials to be welded may be steel sheets of the same sheet thickness or steel sheets of different sheet thicknesses.

An example of the chemical composition of the steel sheets as the materials to be welded contains, in mass %, C: 0.05% to 0.6%, Si: 0.2% to 2.5%, Mn: 1.0% to 4.0%, P: 0.10% or less, S: 0.050% or less, Al: 0.01% to 0.80%, and N: 0.010% or less, and optionally contains, in mass %, one or more selected from Nb: 0.050% or less, Ti: 0.050% or less, B: 0.0050% or less, V: 0.05% or less, Cr: 0.50% or less, Mo: 0.50% or less, Co: 0.50% or less, Cu: 0.50% or less, Ni: 0.50% or less, Sb: 0.020% or less, and Ca and REM: 0.010% or less in total, with the balance consisting of Fe and inevitable impurities.

The tensile strength of the steel sheets as the materials to be welded is preferably 980 MPa or more, and more preferably 1470 MPa or more. The tensile strength is measured in accordance with JIS Z 2241 (1998).

The steel sheets as the materials to be welded may have a coated or plated layer on their surfaces. The coated or plated layer may be provided on both sides of the steel sheet or one side of the steel sheet. The coated or plated layer is, for example, a zinc or zinc alloy coated layer. The zinc or zinc alloy coated layer is a coated layer mainly composed of zinc (a coated layer having a zinc content of 50 mass % or more), and examples thereof include a hot-dip galvanized layer, a galvannealed layer, and an electrogalvanized layer.

The steel sheets described above can be produced according to a conventional method.

[2] Friction Stir Spot Welding Method, and Production Method for Friction Stir Spot Welded Joint Next, a friction stir spot welding method according to an embodiment of the present disclosure and a production method for a friction stir spot welded joint according to an embodiment of the present disclosure will be described.

The friction stir spot welding method according to an embodiment of the present disclosure is a friction stir spot welding method comprising, while rotating a tool including a shoulder portion and a pin portion protruding from the shoulder portion, press-fitting the pin portion into two or more overlapping steel sheets as materials to be welded to weld the steel sheets, wherein at least one of the steel sheets as the materials to be welded has a soft surface layer, a vertical position of a maximum press-fitting depth of the tool satisfies at least one of −0.5 mm or less and −TL×0.50 or less with a lower mating surface of the steel sheets as a reference position, and the shoulder portion and an upper sheet are in contact with each other when the tool reaches the maximum press-fitting depth, a maximum arrival temperature is 850° C. or less, a relationship of the following formula (1) is satisfied:

[Math. 3]

$$\sum_{k=0}^{n} \frac{R_{k+1} \times A_{k+1}}{\sqrt[3]{P_{k+1}}} \leq 41.0 \quad (1)$$

where n is a number of times a welding condition is switched, $R_{k+1}$ is a tool rotation speed (rpm) after kth welding condition switching, $A_{k+1}$ is a tool press-fitting amount (mm) from a time of the kth welding condition switching to a time of (k+1)th welding condition switching, and $P_{k+1}$ is a pressing force (N) after the kth welding condition switching, $R_1$ is an initial tool rotation speed (rpm), $A_1$ is a tool press-fitting amount (mm) under an initial welding condition, $P_1$ is an initial pressing force (N), and $A_{n+1}$ is a tool press-fitting amount (mm) from a time of nth welding condition switching to when the tool reaches the maximum press-fitting depth, the two or more overlapping steel sheets include the upper sheet and a lower sheet that are respectively a steel sheet located at a top and a steel sheet located at a bottom, TL is a thickness (mm) of the lower sheet, the lower mating surface is a mating surface between the lower sheet and a steel sheet adjacent to the lower sheet, and the vertical position is + when above the reference position and is − when below the reference position.

The friction stir spot welding method according to an embodiment of the present disclosure is a method for obtaining (producing) the above-described friction stir spot welded joint according to an embodiment of the present disclosure.

The production method for a friction stir spot welded joint according to an embodiment of the present disclosure comprises welding two or more overlapping steel sheets by the above-described friction stir spot welding method.

The production method for a friction stir spot welded joint according to an embodiment of the present disclosure is a method for producing the above-described friction stir spot welded joint according to an embodiment of the present disclosure.

Two or more overlapping steel sheets as the materials to be welded are welded using the tool including the shoulder portion and the pin portion protruding from the shoulder portion. Specifically, while rotating the tool, the pin portion of the tool is press-fitted into the materials to be welded to weld the steel sheets. The tool is not limited, and a typical tool can be used. The shapes of the shoulder portion and the pin portion, such as the diameter of the shoulder portion (hereafter also referred to as "shoulder diameter"), the diameter of the pin portion (hereafter also referred to as "pin diameter"), the length of the pin portion (hereafter also referred to as "pin length"), and the side tilt angle of the pin, are not limited, and may be determined depending on the steel type and thickness of the steel sheets as the materials to be welded. For example, in the case where two steel sheets having a soft surface layer, a tensile strength of 980 MPa or more, and a thickness of 1.6 mm are used as the materials to be welded, it is preferable to set the shoulder diameter to 6.0 mm to 16.0 mm, the pin diameter to 3.0 mm to 8.0 mm, the pin length to 2.0 mm to 3.5 mm, and the pin side tilt angle to 3° to 30°.

During welding, a backing material is installed on the lower surface of the materials to be welded (i.e. the side opposite to the side on which the pin portion of the tool is press-fitted).

At least one of the steel sheets as the materials to be welded is a steel sheet having a soft surface layer. The definition of the soft surface layer and the method of measuring its thickness are as described above. If the steel sheet as the material to be welded has a soft surface layer before welding, it can generally be determined that the steel sheet has a soft surface layer after the welding. The steel sheets as the materials to be welded are as described above.

In the friction stir spot welding method according to an embodiment of the present disclosure, it is important to satisfy the following conditions.

(d) Vertical Position of Maximum Press-Fitting Depth of Tool

The vertical position of the maximum press-fitting depth of the tool satisfies at least one of −0.5 mm or less and −TL×0.50 or less with the lower mating surface of the steel sheets as a reference position, and the shoulder and the upper sheet of the material to be welded are in contact with each other (i.e. the material to be welded is pressed by the shoulder) when the tool reaches the maximum press-fitting depth. By appropriately controlling the vertical position of the press-fitting depth of the tool, it is possible to promote material flow and make the highest point of the welding interface higher. Moreover, as a result of the shoulder and the upper sheet of the material to be welded coming into contact with each other, the overlapping steel sheets are brought into closer contact with each other and the welding interface is strengthened. The vertical position of the press-fitting depth of the tool is preferably-TL×0.90 or more, without being limited thereto.

(e) Maximum Arrival Temperature

The maximum arrival temperature of the welded portion during welding is 850° C. or less. This enables the hardness difference at the predetermined level of the welded portion to be 80 HV or less. The maximum arrival temperature is preferably 830° C. or less, and more preferably 810° C. or less. The maximum arrival temperature is preferably 650° C. or more.

For example, the maximum arrival temperature is measured in the following manner.

A thermocouple is installed inside the tool, specifically, near the tip of the pin portion of the tool that comes into contact with the welded portion. The temperature during welding (the temperature increasing in the welded portion) is continuously measured using the thermocouple inside the tool, and the maximum temperature measured during welding is taken to be the maximum arrival temperature.

(f) Control of Welding Condition

It is important to appropriately control welding conditions, specifically, to satisfy the relationship of the following formula (1) for the tool rotation speed, the tool press-fitting amount, and the pressing force. The left side of the formula (1) is hereafter also referred to as "E".

[Math. 4]

$$\sum_{k=0}^{n} \frac{R_{k+1} \times A_{k+1}}{\sqrt[3]{P_{k+1}}} \leq 41.0 \quad (1)$$

where n is the number of times a welding condition is switched, $R_{k+1}$ is the tool rotation speed (rpm) after the kth welding condition switching, $A_{k+1}$ is the tool press-fitting amount (mm) from the time of the kth welding condition switching to the time of the (k+1)th welding condition switching, and $P_{k+1}$ is the pressing force (N) after the kth welding condition switching.

Here, $R_1$ is the initial tool rotation speed (rpm), $A_1$ is the tool press-fitting amount (mm) under the initial welding condition (in other words, the tool press-fitting amount (mm) from the time of welding start to the time of the first welding condition switching), $P_1$ is the initial pressing force (N), and $A_{n+1}$ is the tool press-fitting amount (mm) from the time of the nth welding condition switching to when the tool reaches the maximum press-fitting depth. The welding condition that is switched is at least one of the tool rotation speed and the pressing force.

Satisfying the relationship of the formula (1), i.e. limiting E to 41.0 or less, enables the hardness difference at the predetermined level of the welded portion to be 80 HV or less. E is preferably 40 or less. Although no lower limit is placed on E, E is preferably 10 or more.

Here, n (the number of times the welding condition is switched) is an integer of 0 or more. That is, the switching of the welding condition (tool rotation speed and pressing force) is optional, i.e. the welding condition may or may not be switched. In the case where n is 0, $A_1$, which is the tool press-fitting amount under the initial welding condition, is the tool press-fitting amount (mm) from the time of welding start to when the tool reaches the maximum press-fitting depth. n is preferably 5 or less, without being limited thereto.

The initial welding condition, that is, the initial tool rotation speed and initial pressing force as the welding condition before the first welding condition switching, is not limited as long as the maximum arrival temperature is 850° C. or less and the relationship of the formula (1) is satisfied, and may be determined depending on the steel type and sheet thickness of the steel sheets as the materials to be welded. For example, in the case where two steel sheets having a soft surface layer, a tensile strength of 980 MPa or more, and a thickness of 1.6 mm are used as the materials to be welded, it is preferable to set the initial tool rotation speed ($R_1$) to 200 rpm to 2000 rpm and the initial pressing force ($P_1$) to 10 kN to 60 kN.

In the case of switching the welding condition, it is preferable that the tool rotation speed after the switching is lower than the initial tool rotation speed and the pressing force after the switching is greater than the initial pressing force.

For example, in the case where two steel sheets having a soft surface layer, a tensile strength of 980 MPa or more, and a thickness of 1.6 mm are used as the materials to be welded and n (the number of times the welding condition is switched) is 1, the tool rotation speed ($R_2$) after the switching is preferably 40 rpm to 400 rpm, and the pressing force ($P_2$) after the switching is preferably 20 kN to 70 kN.

For example, in the case where two steel sheets having a soft surface layer, a tensile strength of 980 MPa or more, and a thickness of 1.6 mm are used as the materials to be welded and n (the number of times the welding condition is switched) is 1, the timing of switching the tool rotation speed and the pressing force is preferably the timing at which the press-fitting depth ($A_1$) of the tool (pin portion) from the upper surface of the upper sheet reaches 0.8 mm to 2.4 mm.

The welding time is preferably 3 seconds to 60 seconds.

The maximum arrival temperature may be adjusted using an external heat source. The conditions other than those described above are not limited and may be in accordance with conventional methods.

EXAMPLES

Example 1

Embodiments of the present disclosure will be described in more detail below by way of examples. The present disclosure is not limited by the following examples, and changes can be made as appropriate within the scope of the gist of the present disclosure. These are all included within the technical scope of the present disclosure.

Steels having the chemical compositions shown in Table 1 (with the balance consisting of Fe and inevitable impurities) were each obtained by steelmaking and continuously cast to obtain a slab. The slab was then subjected to hot rolling to obtain a hot-rolled steel sheet. The hot-rolled steel sheet was then subjected to pickling. After this, the hot-rolled steel sheet was subjected to cold rolling and annealing to obtain a cold-rolled steel sheet (thickness: 1.2 mm to 1.6 mm). A JIS No. 5 tensile test piece was then collected from the obtained steel sheet so that the direction orthogonal to the rolling direction would be the longitudinal direction (tensile direction). Subsequently, a tensile test in accordance with JIS Z 2241 (1998) was conducted using the collected test piece, and the tensile strength (TS) was measured. Moreover, whether a soft surface layer was present was determined and the average carbon concentration of the soft surface layer was measured by the methods described above. The results are shown in Table 1.

Test pieces of 50 mm×150 mm were cut out from the obtained steel sheets and overlapped crosswise in the combinations shown in Table 2. In the case of overlapping three or more sheets, the upper sheet and the intermediate sheet were overlapped crosswise and the intermediate sheet and the lower sheet were overlapped in parallel (that is, in the below-described cross tensile strength measurement, the cross tensile strength between the upper sheet and the intermediate sheet was measured). Friction stir spot welding was then performed on the center of the cross overlapping part of the test pieces under the conditions shown in Table 2, to obtain a friction stir spot welded joint.

Regarding the shape of the tool, the shoulder diameter was 10 mm, the pin diameter was 4.8 mm, the pin side tilt angle was 10°, and the pin length was 1.8 mm to 4.6 mm depending on the welding conditions. For sample Nos. 1 to 5, 9 to 14, and 16 to 21, the tool rotation speed and the pressing force were simultaneously switched once during welding. For sample No. 6, only the pressing force was switched once during welding. The timing of switching the tool rotation speed and the pressing force was based on the tool press-fitting depth from the upper surface of the upper sheet ("tool press-fitting depth at switching" in Table 2 is the tool press-fitting depth from the upper surface of the upper sheet).

Figure 2:
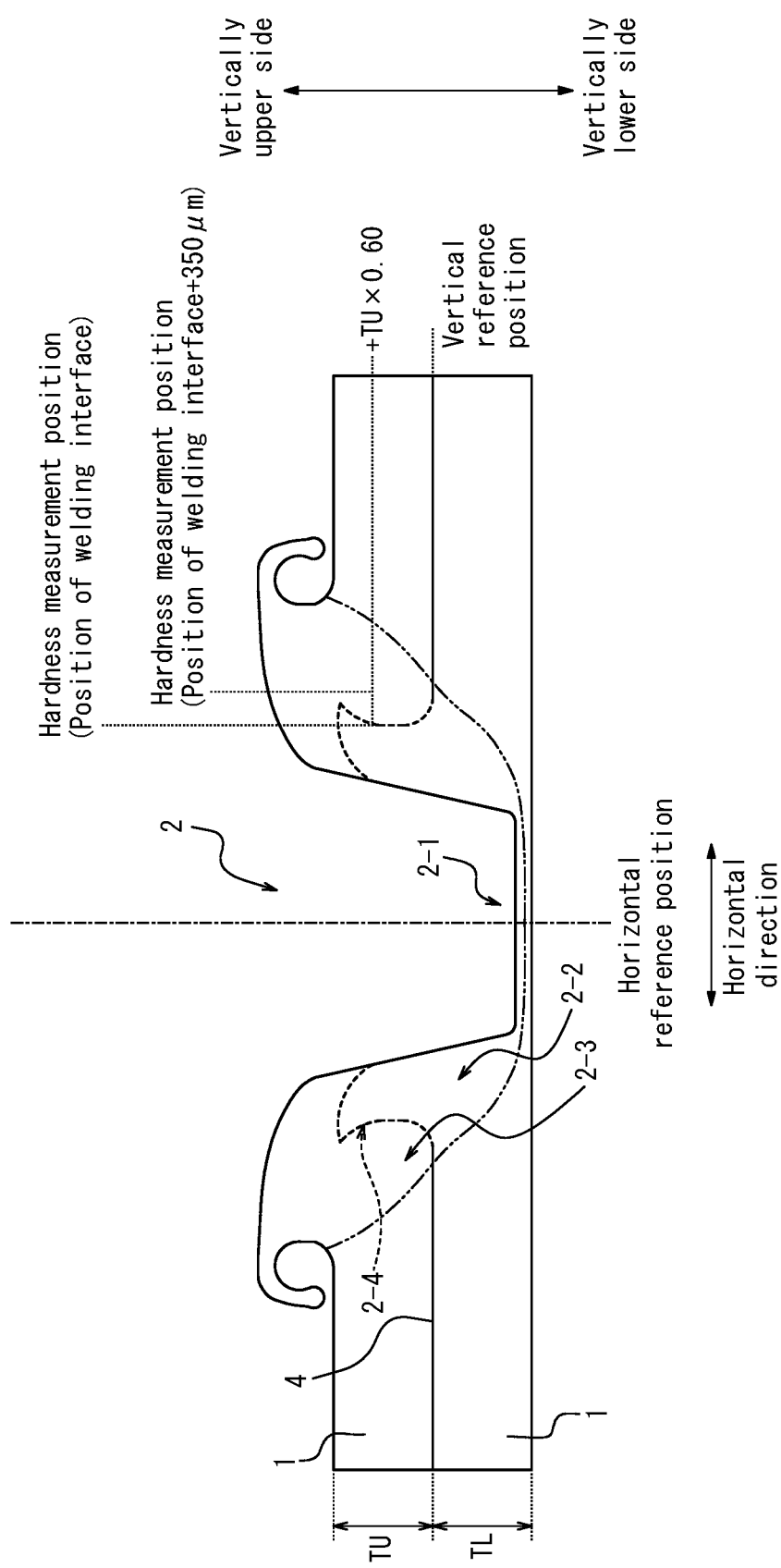
FIG. 2 is a schematic diagram of a vertical section of a friction stir spot welded joint of sample No. 13 (friction stir spot welded joint without an annular groove).

When the tool reached the maximum press-fitting depth, the state of contact between the periphery of the shoulder and the upper sheet was visually checked. As a result, in sample No. 13, the periphery of the shoulder and the upper sheet were not in contact with each other. In all samples other than sample No. 13, the periphery of the shoulder and the upper sheet were in contact with each other when the tool reached the maximum press-fitting depth. For reference, FIG. 2 is a schematic diagram of a vertical section of a friction stir spot welded joint of sample No. 13 (friction stir spot welded joint without an annular groove).

For each of the friction stir spot welded joints thus obtained, the level of the deepest point of the recess, the level of the highest point of the welding interface, and the hardness at the predetermined level of the welded portion were measured and whether an annular groove was present was determined by the foregoing methods. The results are shown in Table 3. The hardness at the predetermined level of the welded portion in Table 3 was measured at a vertical position: +TU×0.60 for sample Nos. 1 to 9 and 13 to 21, and at a vertical position: +TU×0.50 for sample Nos. 10 and 12. In all of sample Nos. 1 to 4, 9 to 10, and 12 to 21, the hardness difference measured at a vertical position: +TU× 0.50 or a vertical position: +TU×0.60 was 80 HV or less.

The same friction stir spot welded joints as above were made under the same conditions, and a cross tensile test in accordance with JIS Z 3137 was conducted using these friction stir spot welded joints to measure the cross tensile strength. The results are shown in Table 3. A cross tensile strength of 8.0 kN or more was evaluated as pass.

TABLE 1

| Steel sample ID | Chemical composition (mass %) | | | | | | | Tensile strength | Soft surface layer | |
| | C | Si | Mn | P | S | Al | N | | Presence | Average carbon concentration (mass %) |
|---|---|---|---|---|---|---|---|---|---|---|
| A | 0.20 | 0.21 | 1.54 | 0.01 | 0.001 | 0.04 | 0.003 | 1470 MPa | Present | 0.12 |
| B | 0.14 | 1.05 | 1.89 | 0.01 | 0.001 | 0.50 | 0.004 | 1180 MPa | Present | 0.11 |
| C | 0.10 | 1.78 | 2.77 | 0.01 | 0.001 | 0.03 | 0.003 | 980 MPa | Present | 0.04 |
| D | 0.31 | 0.50 | 1.17 | 0.01 | 0.001 | 0.03 | 0.004 | 1470 MPa | Present | 0.13 |
| E | 0.21 | 0.19 | 1.32 | 0.01 | 0.001 | 0.04 | 0.003 | 1470 MPa | Not present | — |

TABLE 2

| Sample No. | Materials to be welded | | | | | | Welding conditions | | | | | |
|---|---|---|---|---|---|---|---|---|---|---|---|---|
| | Upper sheet | | Lower sheet | | Intermediate sheet | | Pin length mm | Tool press-fitting depth at switching mm | Tool press-fitting amount | | Pressing force | |
| | Steel sample ID | TU mm | Steel sample ID | TL mm | Steel sample ID | Thickness mm | | | $A_1$ mm | $A_2$ mm | $P_1$ N | $P_2$ N |
| 1 | A | 1.6 | A | 1.6 | — | — | 2.8 | 2.0 | 2.0 | 0.9 | 34300 | 41160 |
| 2 | | 1.6 | | 1.6 | — | — | 2.8 | 2.0 | 2.0 | 0.9 | 34300 | 41160 |
| 3 | | 1.6 | | 1.6 | — | — | 2.8 | 2.0 | 2.0 | 0.9 | 34300 | 41160 |
| 4 | | 1.6 | | 1.6 | — | — | 2.8 | 2.0 | 2.0 | 0.9 | 34300 | 41160 |
| 5 | | 1.6 | | 1.6 | — | — | 2.8 | 2.0 | 2.0 | 0.9 | 34300 | 41160 |
| 6 | | 1.6 | | 1.6 | — | — | 2.8 | 2.0 | 2.0 | 0.9 | 34300 | 41160 |
| 7 | | 1.6 | | 1.6 | — | — | 2.8 | — | 2.9 | — | 34300 | — |
| 8 | | 1.6 | | 1.6 | — | — | 2.8 | — | 2.9 | — | 34300 | — |
| 9 | | 1.6 | | 1.6 | — | — | 2.2 | 1.7 | 1.7 | 0.7 | 34300 | 41160 |
| 10 | | 1.6 | | 1.6 | — | — | 2.0 | 1.6 | 1.6 | 0.6 | 34300 | 41160 |
| 11 | | 1.6 | | 1.6 | — | — | 2.0 | 1.6 | 1.6 | 0.4 | 34300 | 41160 |
| 12 | | 1.6 | | 1.6 | — | — | 1.8 | 1.4 | 1.4 | 0.6 | 34300 | 41160 |
| 13 | | 1.6 | | 1.6 | — | — | 4.0 | 2.0 | 2.0 | 0.9 | 34300 | 41160 |
| 14 | | 1.6 | | 1.6 | A | 1.6 | 4.6 | 3.6 | 3.6 | 0.9 | 34300 | 41160 |
| 15 | | 1.6 | | 1.6 | — | — | 2.8 | — | 2.9 | — | 34300 | — |
| 16 | B | 1.6 | B | 1.6 | — | — | 2.8 | 2.0 | 2.0 | 0.9 | 34300 | 41160 |
| 17 | C | 1.2 | C | 1.2 | — | — | 1.9 | 1.3 | 1.3 | 0.8 | 34300 | 41160 |
| 18 | D | 1.4 | D | 1.4 | — | — | 2.4 | 1.6 | 1.6 | 0.9 | 34300 | 41160 |
| 19 | C | 1.2 | A | 1.6 | — | — | 2.4 | 1.5 | 1.5 | 1.0 | 34300 | 41160 |
| 20 | A | 1.6 | E | 1.6 | — | — | 2.8 | 2.0 | 2.0 | 0.9 | 34300 | 41160 |
| 21 | E | 1.6 | A | 1.6 | — | — | 2.8 | 2.0 | 2.0 | 0.9 | 34300 | 41160 |

| Sample No. | Welding conditions | | | | | | |
|---|---|---|---|---|---|---|---|
| | Tool rotation speed | | Vertical position of maximum press-fitting depth of tool | Maximum arrival temperature °C. | Welding time s | E rpm·mm·$N^{-1/3}$ | Remarks |
| | $R_1$ rpm | $R_2$ rpm | mm | | | | |
| 1 | 500 | 100 | −1.3 | −TL × 0.81 | 664 | 11 | 33.4 | Example |
| 2 | 500 | 150 | −1.3 | −TL × 0.81 | 699 | 6 | 34.7 | Example |
| 3 | 500 | 200 | −1.3 | −TL × 0.81 | 746 | 5 | 36.0 | Example |
| 4 | 500 | 250 | −1.3 | −TL × 0.81 | 812 | 5 | 37.3 | Example |
| 5 | 500 | 400 | −1.3 | −TL × 0.81 | 859 | 4 | 41.2 | Comparative Example |
| 6 | 500 | 500 | −1.3 | −TL × 0.81 | 897 | 4 | 43.8 | Comparative Example |
| 7 | 500 | — | −1.3 | −TL × 0.81 | 969 | 7 | 44.6 | Comparative Example |
| 8 | 1000 | — | −1.3 | −TL × 0.81 | 1070 | 4 | 89.3 | Comparative Example |
| 9 | 700 | 100 | −0.8 | −TL × 0.50 | 723 | 10 | 38.7 | Example |
| 10 | 700 | 150 | −0.6 | −TL × 0.38 | 713 | 6 | 37.1 | Example |
| 11 | 700 | 150 | −0.4 | −TL × 0.25 | 686 | 4 | 36.2 | Comparative Example |
| 12 | 800 | 150 | −0.4 | −TL × 0.25 | 707 | 6 | 37.1 | Comparative Example |
| 13 | 500 | 120 | −1.3 | −TL × 0.81 | 669 | 8 | 33.9 | Comparative Example |
| 14 | 330 | 120 | −1.3 | −TL × 0.81 | 734 | 28 | 39.7 | Example |
| 15 | 420 | — | −1.3 | −TL × 0.81 | 813 | 6 | 37.5 | Example |
| 16 | 500 | 150 | −1.3 | −TL × 0.81 | 718 | 6 | 34.7 | Example |
| 17 | 900 | 120 | −0.9 | −TL × 0.75 | 702 | 8 | 38.8 | Example |
| 18 | 700 | 90 | −1.1 | −TL × 0.79 | 687 | 12 | 36.8 | Example |
| 19 | 800 | 100 | −1.3 | −TL × 0.81 | 710 | 11 | 39.8 | Example |
| 20 | 500 | 100 | −1.3 | −TL × 0.81 | 661 | 11 | 33.4 | Example |
| 21 | 500 | 100 | −1.3 | −TL × 0.81 | 667 | 11 | 33.4 | Example |

TABLE 3

| Sample No. | Level of deepest point of recess mm | Level of highest point of welding interface — | Hardness at predetermined level of welded portion | | |
|---|---|---|---|---|---|
| | | | Welding interface position HV | Welding interface position + 350 μm HV | Hardness difference HV |
| 1 | −1.3 | −TL × 0.81 | +TU × 0.90 | 253 | 264 | 11 |
| 2 | −1.3 | −TL × 0.81 | +TU × 0.87 | 235 | 270 | 35 |
| 3 | −1.3 | −TL × 0.81 | +TU × 0.91 | 232 | 257 | 25 |
| 4 | −1.3 | −TL × 0.81 | +TU × 0.90 | 250 | 277 | 27 |
| 5 | −1.3 | −TL × 0.81 | +TU × 0.88 | 317 | 463 | 146 |
| 6 | −1.3 | −TL × 0.81 | +TU × 0.90 | 369 | 463 | 94 |
| 7 | −1.3 | −TL × 0.81 | +TU × 0.83 | 336 | 454 | 118 |
| 8 | −1.3 | −TL × 0.81 | +TU × 0.80 | 220 | 452 | 232 |
| 9 | −0.8 | −TL × 0.50 | +TU × 0.61 | 239 | 273 | 34 |
| 10 | −0.6 | −TL × 0.38 | +TU × 0.56 | 231 | 260 | 29 |
| 11 | −0.4 | −TL × 0.25 | +TU × 0.46 | — | — | — |
| 12 | −0.4 | −TL × 0.25 | +TU × 0.51 | 241 | 264 | 23 |
| 13 | −1.3 | −TL × 0.81 | +TU × 0.93 | 233 | 254 | 21 |
| 14 | −1.3 | −TL × 0.81 | +TU × 0.95 | 236 | 276 | 40 |
| 15 | −1.3 | −TL × 0.81 | +TU × 0.91 | 244 | 283 | 39 |
| 16 | −1.3 | −TL × 0.81 | +TU × 0.89 | 241 | 269 | 28 |
| 17 | −0.9 | −TL × 0.75 | +TU × 0.86 | 213 | 251 | 38 |
| 18 | −1.1 | −TL × 0.79 | +TU × 0.88 | 260 | 294 | 34 |
| 19 | −1.3 | −TL × 0.81 | +TU × 0.92 | 227 | 263 | 36 |
| 20 | −1.3 | −TL × 0.81 | +TU × 0.89 | 256 | 266 | 10 |
| 21 | −1.3 | −TL × 0.81 | +TU × 0.91 | 252 | 262 | 10 |

| Sample No. | Soft surface layer | | Presence of annular groove — | Cross tensile strength kN | Remarks |
|---|---|---|---|---|---|
| | Presence — | Average carbon concentration mass % | | | |
| 1 | Present | 0.12 | Present | 11.2 | Example |
| 2 | Present | 0.12 | Present | 16.7 | Example |
| 3 | Present | 0.12 | Present | 16.6 | Example |
| 4 | Present | 0.12 | Present | 11.2 | Example |
| 5 | Present | 0.12 | Present | 7.1 | Comparative Example |
| 6 | Present | 0.12 | Present | 6.9 | Comparative Example |
| 7 | Present | 0.12 | Present | 7.3 | Comparative Example |
| 8 | Present | 0.12 | Present | 7.6 | Comparative Example |
| 9 | Present | 0.12 | Present | 9.1 | Example |
| 10 | Present | 0.12 | Present | 8.6 | Example |
| 11 | Present | 0.12 | Present | 5.8 | Comparative Example |
| 12 | Present | 0.12 | Present | 6.6 | Comparative Example |
| 13 | Present | 0.12 | Not present | 3.1 | Comparative Example |
| 14 | Present | 0.12 | Present | 13.6 | Example |
| 15 | Present | 0.12 | Present | 10.5 | Example |
| 16 | Present | 0.11 | Present | 11.5 | Example |
| 17 | Present | 0.04 | Present | 11.4 | Example |
| 18 | Present | 0.13 | Present | 10.4 | Example |
| 19 | Present | 0.04/0.12 | Present | 12.0 | Example |
| 20 | Present | 0.12 | Present | 11.3 | Example |
| 21 | Present | 0.12 | Present | 11.2 | Example |

As shown in Table 3, in all Examples, the cross tensile strength was 8.0 kN or more, and high cross tensile strength was obtained.

In Comparative Examples, on the other hand, sufficient joint strength was not obtained.

REFERENCE SIGNS LIST

1 steel sheet
2 welded portion
3 annular groove
4 unwelded interface
2-1 recess
2-2 first flow portion
2-3 second flow portion
2-4 welding interface

The invention claimed is:

1. A friction stir spot welded joint comprising:
   two or more overlapping steel sheets;
   a welded portion of the steel sheets; and
   an annular groove on an upper surface of the welded portion,
   wherein at least one of the steel sheets has a soft surface layer,
   the welded portion includes a recess, a first flow portion adjacent to the recess, a second flow portion adjacent to the first flow portion, and a welding interface that is a boundary between the first flow portion and the second flow portion,
   a vertical position of a deepest point of the recess satisfies at least one of −0.5 mm or less and −TL×0.50 or less, with a lower mating surface of the steel sheets as a reference position, a vertical position of a highest point of the welding interface is +TU×0.50 or more, with an upper mating surface of the steel sheets as a reference position, at a vertical position: +TU×0.50 or +TU×0.60, a difference between a hardness at a position of the welding interface and a hardness at a position that is (the position of the welding interface+350 µm) in horizontal position is 80 HV or less, the two or more overlapping steel sheets include an upper sheet and a lower sheet that are respectively a steel sheet located at a top and a steel sheet located at a bottom, TU is a thickness in mm of the upper sheet, TL is a thickness in mm of the lower sheet, the upper mating surface is a mating surface between the upper sheet and a steel sheet adjacent to the upper sheet, the lower mating surface is a mating surface between the lower sheet and a steel sheet adjacent to the lower sheet, and the vertical position is + when above the reference position and is − when below the reference position, and the horizontal position is a distance from a reference position.

2. The friction stir spot welded joint according to claim 1, wherein an average carbon concentration of the soft surface layer is less than or equal to 80% of a carbon concentration of a chemical composition of the steel sheet having the soft surface layer.

3. A friction stir spot welding method comprising, while rotating a tool including a shoulder portion and a pin portion protruding from the shoulder portion, press-fitting the pin portion into two or more overlapping steel sheets as materials to be welded to weld the steel sheets, wherein at least one of the steel sheets as the materials to be welded has a soft surface layer, a vertical position of a maximum press-fitting depth of the tool satisfies at least one of −0.5 mm or less and −TL×0.50 or less with a lower mating surface of the steel sheets as a reference position, and the shoulder portion and an upper sheet are in contact with each other when the tool reaches the maximum press-fitting depth, a maximum arrival temperature is 850° C. or less, a relationship of the following formula (1) is satisfied:

[Math. 1]

$$\sum_{k=0}^{n} \frac{R_{k+1} \times A_{k+1}}{\sqrt[3]{P_{k+1}}} \leq 41.0 \quad (1)$$

where n is a number of times a welding condition is switched, $R_{k+1}$ is a tool rotation speed in rpm after kth welding condition switching, $A_{k+1}$ is a tool press-fitting amount in mm from a time of the kth welding condition switching to a time of (k+1)th welding condition switching, and $P_{k+1}$ is a pressing force in N after the kth welding condition switching, $R_1$ is an initial tool rotation speed in rpm, $A_1$ is a tool press-fitting amount in mm under an initial welding condition, $P_1$ is an initial pressing force in N, and $A_{n+1}$ is a tool press-fitting amount in mm from a time of nth welding condition switching to when the tool reaches the maximum press-fitting depth, the two or more overlapping steel sheets include the upper sheet and a lower sheet that are respectively a steel sheet located at a top and a steel sheet located at a bottom, TL is a thickness in mm of the lower sheet, the lower mating surface is a mating surface between the lower sheet and a steel sheet adjacent to the lower sheet, and the vertical position is + when above the reference position and is − when below the reference position.

4. The friction stir spot welding method according to claim 3, wherein an average carbon concentration of the soft surface layer is less than or equal to 80% of a carbon concentration of a chemical composition of the steel sheet having the soft surface layer.

5. A production method for a friction stir spot welded joint, comprising welding two or more overlapping steel sheets by the friction stir spot welding method according to claim 3.

6. A production method for a friction stir spot welded joint, comprising welding two or more overlapping steel sheets by the friction stir spot welding method according to claim 4.

* * * * *